United States Patent [19]

Yokomichi et al.

[11] Patent Number: 5,331,072

[45] Date of Patent: Jul. 19, 1994

[54] POLYAZOPYRROLES AND ELECTRIC CELLS BASED THEREON

[75] Inventors: Yasunori Yokomichi, Osaka; Shinichi Tada, Ikoma; Hitoshi Nishino, Kyoto; Kenji Seki, Yao, all of Japan

[73] Assignee: Osaka Gas Company Limited, Japan

[21] Appl. No.: 8,985

[22] Filed: Jan. 26, 1993

[30] Foreign Application Priority Data

Feb. 6, 1992 [JP] Japan .................. 4-020327

[51] Int. Cl.$^5$ .................. C08F 126/06; C08F 126/02
[52] U.S. Cl. .................. 526/258; 526/310; 252/518
[58] Field of Search .................. 526/258, 310

[56] References Cited

PUBLICATIONS

Z. Yoshida, H. Hashimoto, S. Yoneda, J. Chem. Soc. D. 21, 1344-5, 1971.
Abstract of R (CA 76, 46025j, 1972).

*Primary Examiner*—Joseph L. Schofer
*Assistant Examiner*—Wu C. Cheng
*Attorney, Agent, or Firm*—Larson and Taylor

[57] ABSTRACT

This invention provides; a polyazopyrrole of the general formula (I):

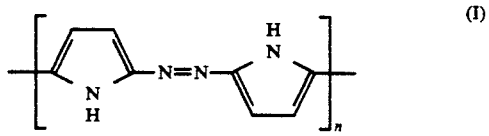

wherein n represents an integer of 5 to 10,000, and an anion-doped polyazopyrrole of the general formula (II):

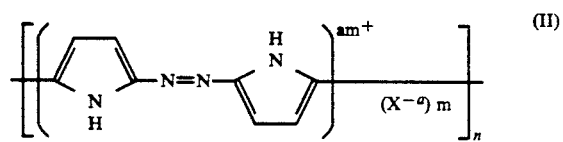

wherein X represents an anion; n represents an integer of 5 to 10,000; m represents 0.001 to 2; and a represents 1, 2, or 3.

1 Claim, 2 Drawing Sheets

POLYAZOPYRROLES AND ELECTRIC CELLS BASED THEREON

CROSS-REFERENCE TO RELATED APPLICATION

This application is related to Japanese Patent application No. 20327/1992 filed Feb. 6, 1992, the entire specification of which is incorporated herein by reference.

FIELD OF THE INVENTION

The present invention relates to a novel polyazopyrrole and an electric cell or battery utilizing the polyazopyrrole.

BACKGROUND OF THE INVENTION

The recent miniaturization of electronic devices calls for the development of electric batteries of reduced weight and, yet, with high performance characteristics. Conductive polymers are attracting attention as electrode active materials for such batteries and a large number of electrically conductive polymers including polyaniline, polypyrrole and polythiophene have heretofore been developed. These polymers are generally synthesized from the corresponding monomers by electrolytic or chemical oxidative polymerization. Since, up to the present time, aniline, pyrrole, thiophene and their derivatives have been chiefly used as starting monomers for such conductive polymers, the conjugated structure of the backbone chain of such polymers other than polyanilines which contain nitrogen atoms consists of carbon-carbon double bonds. Attempts have been made to improve the stability and electrical conductivity of polymers by introducing azo groups, as new structural moieties, into the backbone conjugated system consisting of carbon-carbon double bonds and, as a specific example, polyazophenylenes have been synthesized but none have proved to have characteristics surpassing the polymers in the carbon-carbon double bond series.

SUMMARY OF THE INVENTION

An object of the present invention is to provide a novel electrically conductive polymer excellent in stability and in electrical conductivity.

A further object of the invention is to provide an electric cell based on said novel conductive polymer, which is light in weight and exhibits excellent performance characteristics.

Other objects and features of the invention will become apparent from the following description.

The inventors made an extensive research and experiment to achieve the above-mentioned objects, succeeded in synthesizing a conductive polyazopyrrole having a novel structure and found that the polymer is electrochemically active.

The present invention, thus, provides a polyazopyrrole of the following general formula (I):

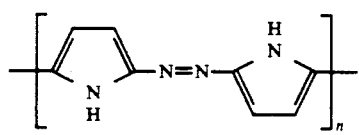

(wherein n represents an integer of 5 to 10,000)

The present invention further provides an anion-doped polyazopyrrole compound of the following general formula (II):

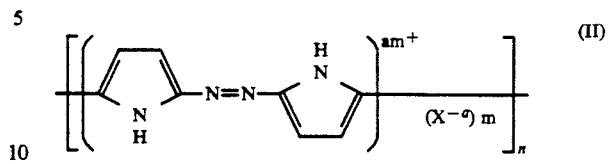

(wherein X represents an anion; n represents an integer of 5 to 10,000; m represents 0.001 to 2; and a represents 1, 2 or 3).

The present invention further provides an electric cell incorporating a polyazopyrrole compound of general formula (I) or (II) as an active electrode material.

DETAILED DESCRIPTION OF THE INVENTION

Figure 1:
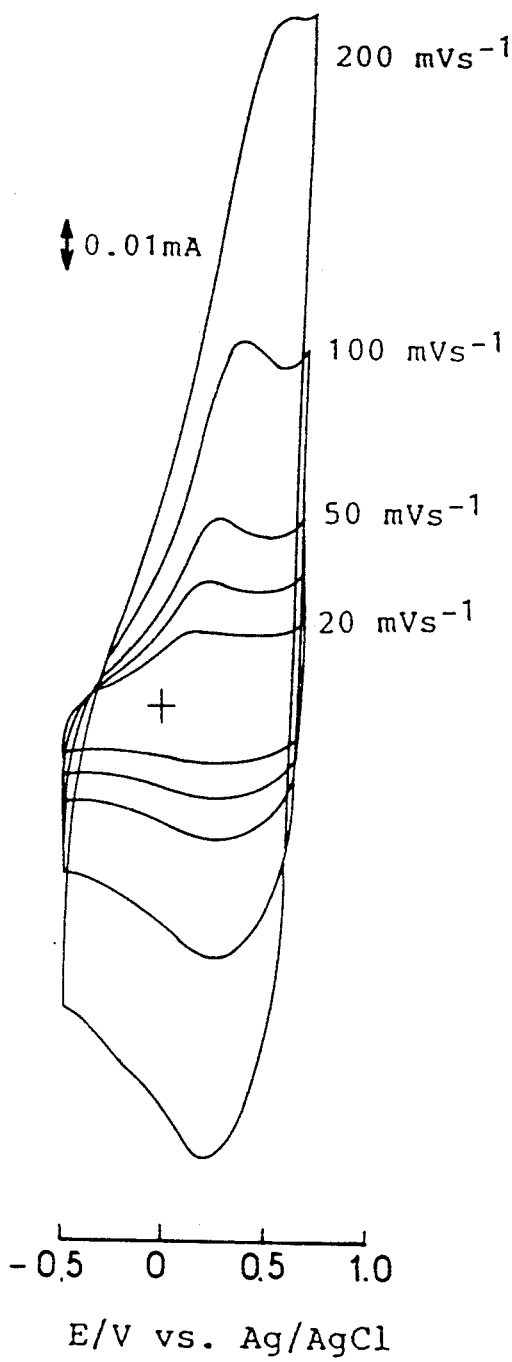
FIG. 1 is a cyclic voltamgram of the polyazopyrrole compound obtained in Example 3.

In the polyazopyrrole compound of general formula (I), n is an integer of generally 5 to 10,000 and preferably 10 to 1,000.

In the anion-doped polyazopyrrole compound of general formula (II), the value of n is generally about 5 to 10,000 and preferably about 10 to 1,000. Referring, further, to the anion-doped polyazopyrrole of general formula (II), the value of m is generally within the range of 0.001 to 2 and preferably within the range of 0.01 to 1. Moreover, a is an integer of 1 to 3, which is preferably 1.

The anion X in the anion-doped polyazopyrrole compound of general formula (II) includes, among others, inorganic acid ions such as perchlorate ion, tetrafluoroborate ion, fluoroarsenate ion, sulfate ion, etc.; halide ions such as chloride ion, fluoride ion, bromide ion, iodide ion, etc.; and organic acid ions such as p-toluenesulfonate ion, trifluoromethanesulfonate ion and so on. Among these anions, perchlorate ion, tetrafluoroborate ion and chloride ion are preferred.

The polyazopyrrole compound of general formula (II) can be obtained, for example, by subjecting an azopyrrole compound of general formula (A):

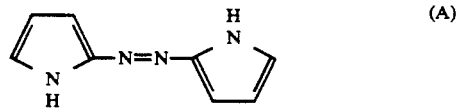

to electrolytic oxidative polymerization in an electrolyte solution containing an ionic substance as a supportive electrolyte.

The term 'ionic substance' is used herein to mean any substance that is capable of functioning as a supportive electrolyte in the electrolytic oxidation process and serving as a dopant anion source for the product polymer (II) as well, and as such includes perchloric acid, sodium perchlorate, potassium perchlorate etc., taking only a chlorate anion as an example. As to other anions, too, the respective ion donors may be considered as ionic substances.

As the supportive electrolyte for this electrolytic oxidative polymerization reaction, a salt which is solvent-soluble and ready to be dissociated to liberate the desired anion is employed. To be specific, the supportive electrolyte includes, among others, perchlorates such as tetrabutylammonium perchlorate, tetraethylammonium perchlorate, lithium perchlorate, etc., tetrafluoroborates such as sodium tetrafluoroborate, lithium tetrafluoroborate, tetraethylammonium tetrafluoroborate, tetrabutylammonium tetrafluoroborate, etc., sulfonates such as sodium toluenesulfonate, lithium trifluoromethanesulfonate, etc., iodates such as lithium iodate etc., bromides such as lithium bromide etc., and chlorides such as lithium chloride and so on. Among them, tetrabutylammonium perchlorate, tetraethylammonium tetrafluoroborate and tetrabutylammonium tetrafluoroborate are particularly preferred. The anion derived from such a supportive electrolyte becomes the anion X in the polyazopyrrole of general formula (II).

The solvent for use in this electrolytic oxidative polymerization reaction is preferably one in which the supportive electrolyte is highly soluble. Examples of preferable solvents are alcohols such as methanol, ethanol, isopropyl alcohol, etc.; ethers such as tetrahydrofuran, dioxane, dimethylethylene glycol, etc.; carbonates such as propylene carbonate, ethylene carbonate, diethyl carbonate, etc.; nitro compounds such as nitrobenzene, nitromethane, etc.; and acetonitrile, N,N-dimethylformamide, dimethyl sulfoxide, hexamethylphosphoramide, water, a mixture of water and at least one of water-miscible solvents and so on. Among these solvents, acetonitrile, propylene carbonate and tetrahydrofuran are more preferred.

The concentration of azopyrrole in the solvent is generally about 0.01 to 1 mole/liter and preferably about 0.05 to 0.5 mole/litter.

The concentration of supportive electrolyte in the solvent is generally about 0.01 to 1 mole/liter and preferably about 0.05 to 0.5 mole/liter.

Electrolysis can be carried out by any of the constant current, constant potential, potential scanning and other techniques and may also be carried out by whichever of the two-electrode method or the three-electrode method. The reference electrode to be used in the 3-electrode system is preferably an SCE or AG/AGCl electrode. The working and counter electrodes may for example be conductive glass, Pt or carbon electrodes. By way of illustration, the current density for constant current electrolysis is generally about 0.01 to 10 mA/cm$^2$ and preferably about 0.1 to 1 mA/cm$^2$.

As the electrolytic polymerization proceeds under the above conditions, the desired polyazopyrrole of general formula (II) forms progressively as a black film on the positive electrode surface.

The polyazopyrrole (II) of the present invention can also be produced by chemical polymerization of azopyrrole in a solvent in the presence of a polymerization initiator.

The solvent which can be used in the chemical polymerization reaction includes, among others, alcohols such as methanol, ethanol, isopropyl alcohol, etc.; ethers such as tetrahydrofuran, dioxane, dimethylethylene glycol, etc.; carbonates such as propylene carbonate, ethylene carbonate, diethyl carbonate, etc.; nitro compounds such as nitrobenzene, nitromethane, etc.; and acetonitrile, N,N-dimethylformamide, dimethyl sulfoxide, hexamethylphosphoramide, water, a mixture of water and at least one of water-miscible solvents and so on. Among these solvents for use in the chemical polymerization reaction, acetonitrile, propylene carbonate and tetrahydrofuran are preferred. The concentration of the azopyrrole in the solvent for chemical polymerization is generally about 0.01 to 1 mole/liter and preferably about 0.1 to 0.5 mole/liter.

The polymerization initiator can be selected from a wide variety of initiators commonly employed. Typical examples of the initiators are areacids such as hydrochloric acid, sulfuric acid, etc.; transition metal salts such as ferric chloride, ferric perchlorate, silver chloride, silver perchlorate, cupric chloride, etc.; hydrogen peroxide, and quinones such as benzoquinone, naphthoquinone, etc. When the anion-doped polyazopyrrole of general formula (II) is produced by the chemical polymerization method, the anion derived from the polymerization initiator acts as the dopant. Among said polymerization initiators, ferric compounds such as ferric chloride, ferric perchlorate, etc. and silver compounds such as silver chloride and silver perchlorate are preferred. The polymerization initiator is used in a concentration of about 0.001 to 1 mole/liter in the reaction solution. The reaction temperature for chemical polymerization is about $-20°$ to $80°$ C. and the reaction time is about 1 to 24 hours.

The polyazopyrrole of general formula (I) can be obtained by electrolytic reduction of the anion-doped polyazopyrrole of general formula (II). The method for this reduction is not particularly limited. Thus, for example, the reduction can be carried out at a constant current of about 0.1 to 1 mA/cm$^2$ until the working electrode potential has reached $-0.5$ to 0 V relative to Ag/AgCl.

The polyazopyrrole of general formula (I) and the anion-doped polyazopyrrole of general formula (II) can be respectively purified by the conventional procedure, such as solvent washing.

The electric cell to which either polyazopyrrole of the invention is applicable includes a variety of secondary cells, for instance. Other components of such cells may be the same as those used in the known cells. For example, when a lithium secondary cell is fabricated using the polyazopyrrole of the invention as the positive electrode active material and lithium metal as the negative electrode, the cell has an open-circuit voltage of not less than 3.5 V. In this case, the electrolyte is preferably a highly concentrated solution of lithium salt in an organic solvent which is preferably a mixture of carbonate and dimethoxyethane.

Since the polyazopyrrole of the present invention is electrochemically active and highly stable, it contributes to the fabrication of cells which are lightweight and excellent in performance.

The following examples illustrate the invention in further detail.

EXAMPLE 1

An ITO plate (1 cm$\times$2 cm), as the working electrode, and a Pt plate (2.5 cm$\times$2.5 cm), as the counter electrode, were immersed in a solution containing 1 mmol of tetrabutylammonium perchlorate and 1 mmol of azopyrrole in 10 ml of acetonitrile and the electrolytic oxidation was carried out in an argon atmosphere at a constant current of 0.2 mA/cm$^2$. After the passage of 24 coulombs the working electrode was taken out. The black precipitate on the electrode surface was washed with methanol and dried under reduced pressure to provide 24 mg of a polyazopyrrole of general formula (II).

The product was molded into a pellet and its electrical conductivity was measured. The conductivity value was $2 \times 10^{-2}$ S/cm. The pellet was further allowed to stand in the air for 2 months and its conductivity was measured again. There was no change in electrical conductivity.

The Fourier transform infrared spectrum (FT-IR) data on the above product are given below. FT-IR(KBr)$\nu$(cm$^{-1}$): 1578, 1479, 1033, 897, 782

The elemental analysis of the product is shown in Table 1.

TABLE 1

|  | H | C | N | O | Cl |
|---|---|---|---|---|---|
| Found (%) | 4.7 | 53.0 | 30.8 | 7.4 | 4.1 |
| Calculated (%) | 3.4 | 53.7 | 31.3 | 7.4 | 4.1 |

The elemental analysis given in Table 1 shows that the product obtained having a carbon/nitrogen ratio (mol ratio)=2 (calculated value=2) is the desired polymer consisting of recurring azopyrrole units.

The value of m in general formula (II) as calculated from the elemental analysis shown in Table 1 was 0.21.

EXAMPLE 2

A Pt plate (2 cm×2 cm), as the working electrode, and a Pt plate (2.5 cm×2.5 cm), as the counter electrode, were immersed in a polymerization starting solution containing 1 mmol of tetrabutylammonium perchlorate and 1 mmol of azopyrrole in 10 ml of acetonitrile and the electrolytic oxidation was carried out in an argon atmosphere at a constant current of 0.2 mA/cm$^2$.

After the passage of 24 coulombs, electrolytic reduction of the product was carried out at $-0.1$ mA/cm$^2$. The resulting product was washed and dried under reduced pressure to provide 21 mg of a neutral polyazopyrrole.

The above polymer showed an FT-IR spectrum similar to that presented in Example 1. Electron spectroscopy (ESCA) provided no Cl$^-$ signal.

The elemental analysis of the polymer obtained in Example 2 is given in Table 2.

TABLE 2

|  | H | C | N |
|---|---|---|---|
| Found (%) | 5.0 | 60.2 | 34.9 |
| Calculated (%) | 3.8 | 60.8 | 35.4 |

EXAMPLE 3

A Pt wire, as the working electrode, and a Pt wire, as the counter electrode, were immersed in a polymerization starting solution containing 1 mmol of tetrabutylammonium perchlorate and 1 mmol of azopyrrole in 10 ml of propylene carbonate and the electrolytic polymerization reaction was carried out in an argon atmosphere by performing 200 potential sweeps between $-0.1$ and $+0.5$ V (vs. Ag/Ag$^+$) at the rate of 0.1 V/s. As a result, a black film was produced on the working electrode. The electrode carrying this black film was washed as such with methanol and dried under reduced pressure. It was then immersed in 0.1M tetrabutylammonium perchlorate-propylene carbonate and the cyclic voltamgram was recorded within the sweep rate range of 20 to 200 mV/s. The result is presented in FIG. 1.

FIG. 1 shows a redox peak around 0.2 to 0.3 V (vs. Ag/Ag$^+$) indicating that the polymer obtained is electrochemically active. It is apparent that the polyazopyrrole of the present invention is of use as an electrode active material for electric cells.

The following instruments were used for the above analyses.

IR: Nicolet 20 SXC.
Conductivity meter: Loresta AP, Mitsubishi Petrochemical Co., Ltd.
Elemental analysis: PERKIN ELMER 2400.
ESCA: Shimadzu 850.

EXAMPLE 4

A solution of 2 mmol of azopyrrole in 2 cc of acetonitrile was added dropwise to a solution of 3.6 mmol of Fe(ClO$_4$)$_3$·6H$_2$O in 8 cc of acetonitrile and the reaction was conducted at 0° C. for 2 hours.

The resulting black precipitate was washed with methanol-acetonitrile and dried under reduced pressure to provide 0.49 g of a polyazopyrrole of general formula (II). The polyazopyrrole showed an electrical conductivity of $2 \times 10^{-5}$ Scm$^{-1}$.

EXAMPLE 5

A polyazopyrrole of general formula (II) was synthesized by a similar procedure as Example 4 except that Cu(ClO$_4$)$_2$·6H$_2$O was used in lieu of Fe(ClO$_4$)$_3$·6H$_2$O as the oxidizing agent.

The yield of the polymer was 0.50 g and the polymer showed an electrical conductivity of $2 \times 10^{-6}$ Scm$^{-1}$.

EXAMPLE 6

A polyazopyrrole of general formula (II) was synthesized by a similar procedure as Example 4 except that FeCl$_3$ was used as the oxidizing agent.

The yield of the polymer was 0.52 g and the polymer showed an electrical conductivity of $6 \times 10^{-6}$ Scm$^{-1}$.

EXAMPLE 7

A polyazopyrrole of general formula (II) was synthesized by a similar procedure as Example 4 except that an aqueous solution of Cu(BF$_4$)$_2$ was used as the oxidizing agent.

The yield of the polymer was 0.45 g and the polymer showed an electrical conductivity of $6 \times 10^{-3}$ Scm$^{-1}$.

EXAMPLE 8

A carbon plate (1 cm×2 cm), as the working electrode, and a Pt plate (2.5 cm×2.5 cm), as the counter electrode, were immersed in a polymerization starting solution containing 0.1M of azopyrrole and 0.1M of tetrabutylammonium tetrafluoroborate, and using an Ag/AgCl as the reference electrode, the constant current electrolytic oxidative polymerization reaction was carried out in an argon atmosphere at 1 mA/cm$^2$ for 2 hours.

Figure 2:
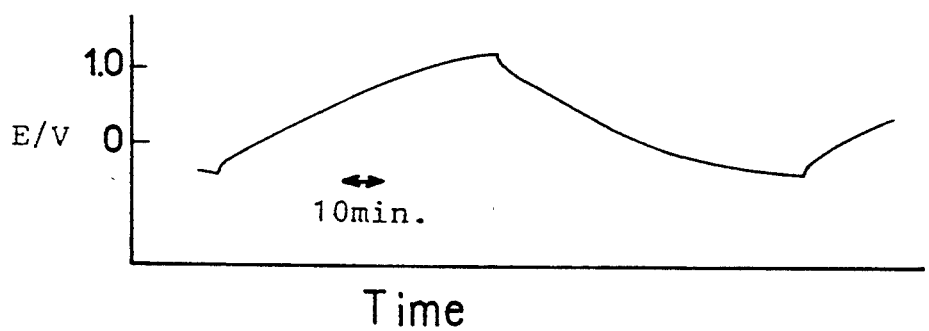
FIG. 2 is a diagram showing the performance of the polyazopyrrole compound obtained in Example 8 as an active electrode material.

Using about 4 mg of the polyazopyrrole (II) precipitated on the working electrode, its cycle characteristic was determined. The result is shown in FIG. 2. The energy density was 100 mAh/g.

The cycle characteristic was determined under the following conditions.

Electrolyte . . . 0.1M LiClO$_4$ in acetonitrile
Counter electrode . . . Pt
Reference electrode . . . Ag/AgCl −0.2−1.2 V
±0.3 mA

EXAMPLE 9

A Pt plate (2 cm×2 cm), as the working electrode, and a Pt plate (2.5 cm×2.5 cm), as the counter electrode, were immersed in a solution containing 1 mmol of sodium toluenesulfonate and 1 mmol of azopyrrole in 10 ml of acetonitrile and the electrolytic oxidation reaction was conducted in an argon atmosphere at a constant current of 1 mA/cm². After the passage of 7.2 coulombs the working electrode was taken out and inspected. The black precipitate on the electrode surface was washed with acetonitrile and dried under reduced pressure to provide 6 mg of a polyazopyrrole of general formula (II).

Using the polyazopyrrole precipitated on the working electrode, its cycle characteristic was determined as in Example 8. The energy density was 55 mAh/g.

EXAMPLE 10

The procedure of Example 8 was repeated except that lithium trifluoromethanesulfonate was used as the supportive electrolyte to provide 5.8 mg of a polyazopyrrole of general formula (II).

The cycle characteristic of the polyazopyrrole was measured as in Example 8. The energy density was 83 mAh/g.

EXAMPLE 11

A Pt plate (2 cm×2 cm), as the working electrode, and a Pt plate (2.5 cm×2.5 cm), as the counter electrode, were immersed in a solution containing 1 mmol of lithium perchlorate and 1 mmol of azopyrrole in 10 ml of tetrahydrofuran and the electrolytic oxidation reaction was conducted in an argon atmosphere at a constant current of 2 mA/cm². After the passage of 7.2 coulombs, the working electrode was taken out and inspected. The black precipitate on the electrode surface was washed with acetonitrile and dried under reduced pressure to recover 5.7 mg of a polyazopyrrole of general formula (II).

The cycle characteristic of this polyazopyrrole was measured as in Example 8. The energy density was 55 mAh/g.

What is claimed is:

1. A polazopyrrole of the general formula (I):

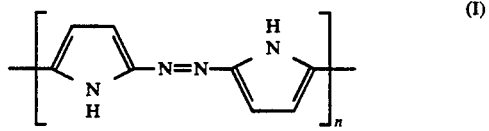

wherein n represents an integer of 5 to 10,000.

* * * * *